United States Patent
Lee et al.

(10) Patent No.: US 12,019,906 B2
(45) Date of Patent: Jun. 25, 2024

(54) ELECTRONIC DEVICE AND METHOD OF ELECTRONIC DEVICE OPERATING FILE SYSTEM USING DATA COMPRESSION AND MEMORY PARTITION

(71) Applicant: SAMSUNG ELECTRONICS CO., LTD., Suwon-si (KR)

(72) Inventors: Woojoong Lee, Suwon-si (KR); Yeongjin Gil, Suwon-si (KR); Sungjong Seo, Suwon-si (KR); Hobin Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 30 days.

(21) Appl. No.: 17/890,653

(22) Filed: Aug. 18, 2022

(65) Prior Publication Data

US 2023/0067968 A1 Mar. 2, 2023

Related U.S. Application Data

(63) Continuation of application No. PCT/KR2022/011490, filed on Aug. 3, 2022.

(30) Foreign Application Priority Data

Aug. 27, 2021 (KR) .................. 10-2021-0113819

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ..... G06F 3/0655; G06F 3/0604; G06F 3/0679
See application file for complete search history.

(56) References Cited

U.S. PATENT DOCUMENTS 7,356,662 B2 4/2008 Shoff et al.
8,285,687 B2 10/2012 Voll et al.
(Continued)

FOREIGN PATENT DOCUMENTS

JP 2002-132546 A 5/2002
JP 2002-279376 A 9/2002
(Continued)

OTHER PUBLICATIONS

International Search Report (PCT/ISA/210) and Written Opinion (PCT/ISA/237) dated Nov. 2, 2022 issued by the International Searching Authority in International Application No. PCT/KR2022/011490.

*Primary Examiner* — Edward J Dudek, Jr.
(74) *Attorney, Agent, or Firm* — Sughrue Mion, PLLC (57) ABSTRACT

An electronic device may include a storage, a memory, and a processor configured to read or write a file from or to the memory. The memory may include a lower file system for compressing and storing a file by using a first partition of the storage and an upper file system for decompressing and storing a file by using a second partition of the storage and/or the lower file system. The processor may copy, to an upper file system of the memory, a first file having an access number greater than a certain level by decompressing the first file in the lower file system, and may control a stackable file system to read the first file from the upper file system and to provide the first file to the application layer based on a request from the application layer being detected with respect to the copied first file.

18 Claims, 4 Drawing Sheets

(56) References Cited

U.S. PATENT DOCUMENTS

| | | | |
|---|---|---|---|
| 9,355,112 B1* | 5/2016 | Armangau | G06F 16/1744 |
| 9,933,948 B2 | 4/2018 | Saitou et al. | |
| 10,209,915 B2 | 2/2019 | Yun et al. | |
| 10,565,142 B2 | 2/2020 | Jin et al. | |
| 10,733,094 B2 | 8/2020 | Kwak | |
| 10,782,880 B2 | 9/2020 | Kim et al. | |
| 11,209,995 B2 | 12/2021 | Sugihara et al. | |
| 2010/0325523 A1* | 12/2010 | Slyz | G06F 8/65 |
| | | | 711/E12.008 |
| 2012/0158647 A1 | 6/2012 | Yadappanavar et al. | |
| 2013/0073798 A1 | 3/2013 | Kang et al. | |
| 2015/0169604 A1 | 6/2015 | Oh et al. | |
| 2016/0306583 A1* | 10/2016 | Yun | G06F 16/188 |
| 2016/0328448 A1 | 11/2016 | Kaijima et al. | |
| 2016/0371190 A1 | 12/2016 | Romanovskiy | |
| 2018/0260413 A1 | 9/2018 | Matsui et al. | |

FOREIGN PATENT DOCUMENTS

| | | |
|---|---|---|
| JP | 5976980 B1 | 8/2016 |
| JP | 2019-160179 A | 9/2019 |
| JP | 2020-160769 A | 10/2020 |
| KR | 10-2013-0031046 A | 3/2013 |
| KR | 10-2016-0122413 A | 10/2016 |
| KR | 10-2019-0045049 A | 5/2019 |
| KR | 10-2019-0052366 A | 5/2019 |
| KR | 10-2263357 B1 | 6/2021 |
| KR | 10-2022-0101847 A | 7/2022 |
| KR | 10-2022-0128791 A | 9/2022 |
| KR | 10-2022-0169695 A | 12/2022 |
| KR | 10-2557557 B1 | 7/2023 |

* cited by examiner

ELECTRONIC DEVICE AND METHOD OF ELECTRONIC DEVICE OPERATING FILE SYSTEM USING DATA COMPRESSION AND MEMORY PARTITION

CROSS-REFERENCE TO THE RELATED APPLICATION(S)

This application is a bypass continuation application of International Application No. PCT/KR2022/011490, filed on Aug. 3, 2022, in the Korean Intellectual Property Receiving Office, which claims priority to Korean Patent Application No. 10-2021-0113819, filed on Aug. 27, 2021, the disclosures of which are incorporated by reference herein in their entireties.

BACKGROUND

1. Field

Various embodiments of the disclosure relate to an electronic device and relate to an electronic device including storage, for example, and an operating method thereof.

2. Description of the Related Art

Recently developed electronic devices, such as a smartphone, a tablet PC, a portable multimedia player (PMP), a personal digital assistant (PAD), a laptop personal computer (PC), and a wearable device, may perform various functions (e.g., game, a social network service (SNS), the Internet, multimedia, and the photographing and execution of a photo and video) in addition to mobility.

The electronic device may include storage, such as a NAND flash memory or a solid state disk (SSD), in order to store a large amount of data necessary to perform various functions.

The electronic device may use a virtual memory management scheme for efficiently storing and/or managing data. For example, the virtual memory management scheme is a method of managing data by mapping a main memory (e.g., a dynamic random access memory (DRAM)) and storage (e.g., a non-volatile memory), and may include a demand paging method of loading, onto the main memory, at least some data (e.g., a page) necessary for a processor among data stored in the storage and processing the at least some data.

If a system partition of an electronic device is compressed, the capacity of a read only memory (ROM) can be reduced, but execution performance may be slowed because a decompression operation is required when an application or service stored in the system partition is loaded.

In order to solve such a problem, a file expected to be frequently used may be selected and decompressed, but a file access pattern may be different for each user, and separately managing a decompression file and a compression file may be difficult.

An electronic device according to various embodiments of the disclosure is to provide a method of optimizing an application and a service execution time of an electronic device by using a stackable file system.

SUMMARY

According to an aspect of an example embodiment of the disclosure, provided is an electronic device including a storage; a memory; and a processor electrically connected to the memory and configured to read or write a file from or to the memory. The memory includes: a lower file system configured to compress and store at least one file by using a first partition of the storage; an upper file system configured to compress and store at least one file by using at least one of a second partition of the storage or the lower file system; and a stackable file system configured to, based on a request from an application layer, provide a requested file by using at least one of the lower file system or the upper file system. The processor is configured to: obtain a number of times in which the stackable file system accesses a corresponding file of the at least one file in the lower file system based on a request from the application layer with respect to the corresponding file; copy, to the upper file system, a first file having an access number greater than a certain level by decompressing the first file in the lower file system; and control the stackable file system to read the first file from the upper file system and provide the first file to the application layer based on a request from the application layer being detected with respect to the copied first file.

According to an aspect of an example embodiment of the disclosure, provided is a method of operating, by an electronic device, a file system, wherein the electronic device includes a storage and a memory. The memory includes a lower file system configured to compress and store at least one file by using a first partition of the storage; an upper file system configured to compress and store at least one file by using at least one of a second partition of the storage or the lower file system; and a stackable file system configured to, based on a request from an application layer, provide a requested file by using at least one of the lower file system or the upper file system. The method includes: obtaining a number of times in which the stackable file system accesses a corresponding file of the at least one file in the lower file system based on a request from the application layer with respect to the corresponding file; copying, to the upper file system, a first file having an access number greater than a certain level by decompressing the first file in the lower file system; and controlling the stackable file system to read the first file from the upper file system and providing the first file to the application layer based on a request from the application layer being detected with respect to the copied first file.

According to various embodiments, the electronic device may optimize an application and a service execution time by decompressing and storing a file that is frequently accessed while the electronic device is used by using a stackable file system.

The electronic device according to an embodiment of the disclosure may identify an electronic device usage pattern of a user and optimize a ROM capacity by using the stackable file system.

BRIEF DESCRIPTION OF DRAWINGS

Embodiments of the inventive concept will be more clearly understood from the following detailed description taken in conjunction with the accompanying drawings.

DETAILED DESCRIPTION

Hereinafter, embodiments of the inventive concept is described in detail with reference to the accompanying drawings.

Figure 1:
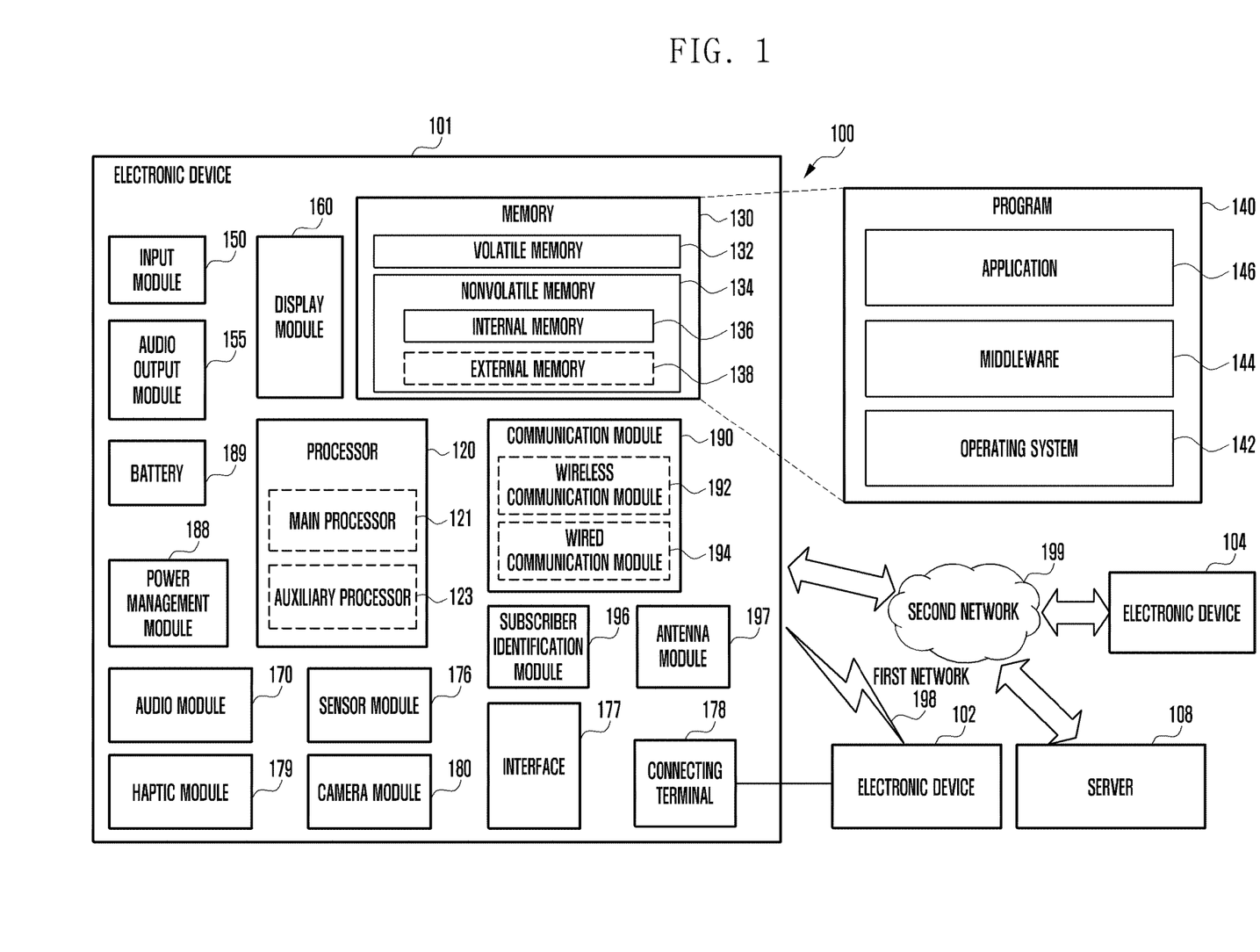
FIG. 1 is a block diagram of an electronic device within a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., in a wired way) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., in a wired way) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., in a wired way), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
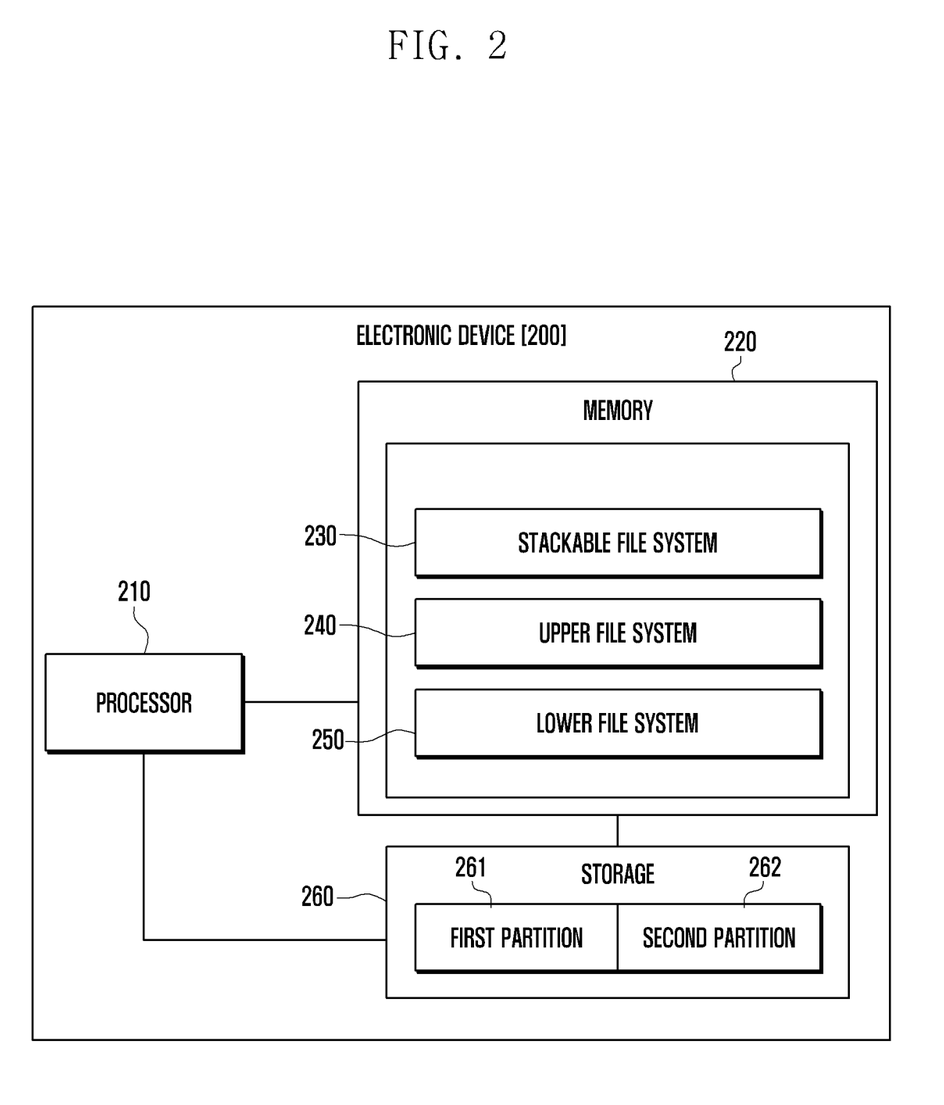
FIG. 2 is a block diagram illustrating an example of a configuration of an electronic device according to various embodiments.

FIG. 2 illustrates, as a block diagram, a construction of an electronic device according to various embodiments.

According to FIG. 2, the electronic device 200 may include a processor 210, a memory 220, and storage 260, and some of the illustrated components may be omitted or substituted. The electronic device 200 may further include at least some of components and/or functions of the electronic device 101 in FIG. 1. At least some of the illustrated (or not-illustrated) components of the electronic device may be operatively, functionally and/or electrically connected.

According to various embodiments, the processor 210 is a component capable of performing an operation or data processing regarding control and/or communication of each of the components of the electronic device 200, and may include one or more processors. The processor 210 may include at least some of components and/or functions of the processor 120 in FIG. 1.

According to various embodiments, an operation and a data processing function which may be embodied by the processor 210 on the electronic device 200 will not be limited, but characteristics related to control of a compression file system within the memory 220 are described in detail below. Operations of the processor 210 may be performed by loading instructions stored in the memory 220 (e.g., the memory 130 in FIG. 1). The file system may mean a system for storing and organizing a file or data so that the file or data may be easily found and accessed in the electronic device. One or more file systems (e.g., 230 to 250) according to various embodiments of the disclosure may mean a file system manager (e.g., a program module) which constructs a file system and stores and manages a file and a directory in the storage 260 and the memory 220.

According to various embodiments, the electronic device 200 may include one or more memories 220 and storages 260. The memory 220 may include a volatile memory, such as a dynamic random access memory (DRAM), a static RAM (SRAM), or a synchronous dynamic RAM (SDRAM). The storage 260 may include at least one of a one-time programmable ROM (OTPROM), a PROM, an EPROM, an EEPROM, a mask ROM, a flash ROM, a flash memory, a hard disk, or a solid state drive (SSD). Alternatively, the memory 220 is a non-volatile memory, and may include a high-capacity storage device. For example, the memory 220 may include at least one of a one-time programmable ROM (OTPROM), a PROM, an EPROM, an EEPROM, a mask ROM, a flash ROM, a flash memory, a hard disk, or a solid state drive (SSD). The memory 220 may store various file data, and file data stored therein may be updated based on an operation of the processor 210.

According to various embodiments, the electronic device 200 may include a layer of a stackable file system 230, a layer of an upper file system 240 which is an upper layer of the stackable file system 230 and decompresses and stores a file supporting read and write operations, a layer of a lower file system 250 which is a lower layer of the stackable file system 230 and compresses and stores a read-only file, and the storage 260 which is a lower layer of the lower file system 250 and includes a partition (e.g., a first partition 261 and a second partition 262). The stackable file system 230 may include a system which may be used by intercepting a system call in a kernel level without a separate daemon. The daemon may mean a background process that is executed when the system is first driven. The daemon may wait for a request from a user in the state in which the daemon has been stored in the memory 220, and may recognize a request when the request from the user occurs.

According to various embodiments, the stackable file system 230 may provide a file in response to a request from an application layer by using the lower file system 250 and/or the upper file system 240. An operation provided by the file may mean an operation of opening and reading a requested file or reading an already opened file and delivers the read file to the application layer. The operation of opening the file may mean an operation of searching for the name of a file in the storage and preparing the file so that the file may be read and/or written in the application layer. The operation of reading the file may mean an operation of loading data of an opened file onto the memory 220. The loading may mean an operation of invoking a program itself and a resource necessary for an operation from an auxiliary memory (e.g., a hard disk) to a main memory (e.g., a memory).

According to an embodiment, in response to a request from the application layer, the stackable file system 230 may read a requested file from the upper file system 240 and provide the requested file to the application layer when the corresponding file is present in the upper file system 240, and may read a requested file from the lower file system 250 and provide the requested file to the application layer when the corresponding file is not present in the upper file system 240.

According to various embodiments, a file having an access frequency equal to or greater than a first level in the lower file system 250 may be decompressed and copied to the upper file system 240, and when the file having the access frequency equal to or greater than the first level is to be read, the processor 210 may control to read the file from the upper file system 240, not the lower file system 250 and to provide the read file to a higher layer. The access may mean an operation of reading an already opened file or opening and reading a compressed file. The file having the access frequency equal to or greater than the first level may mean a file whose number of times that the file is read by the application layer is greater than a certain level.

According to various embodiments, the processor 210 may execute various types of software (e.g., the program 140). The memory 220 may include the stackable file system 230, the upper file system 240, the lower file system 250, and the storage 260. The stackable file system 230, the upper file system 240, and the lower file system 250 may be program modules stored in the memory 220, and may be operated by the processor 210.

According to various embodiments, the processor 210 may store, in the storage 260, data having a file form through the stackable file system 230. For example, the stackable file system 230 may mean a data structure or system managed by the processor 220 in order to store data in the storage 260. The electronic device 200 may use the stackable file system 230 in order to write data in the storage 260 or efficiently read data stored in the storage 260. In various embodiments, the stackable file system 230 is assumed and described as a flash friendly file system (F2FS), but a form of the stackable file system 230 is not limited thereto and may include a file system having another form. The F2FS may mean a file system optimized for a NAND flash memory based on a log-based storage.

According to an embodiment, the storage 260 may include the first partition 261 and the second partition 262. The upper file system 240 and the lower file system 250 may read or write files from or to the first partition 261 and the second partition 262 through different paths. For example, the lower file system 250 may only read a stored file from the first partition 261. The upper file system 240 may read or write a file stored in the lower file system 250 through a first path (e.g., a first path 310 in FIG. 3) or may read or write a file from or to the second partition 262 through a second path (e.g., a second path 320 in FIG. 3). A file stored in the first partition 261 may be in a compressed state, and a file stored in the second partition 262 may be in a decompressed or uncompressed state.

Figure 3:
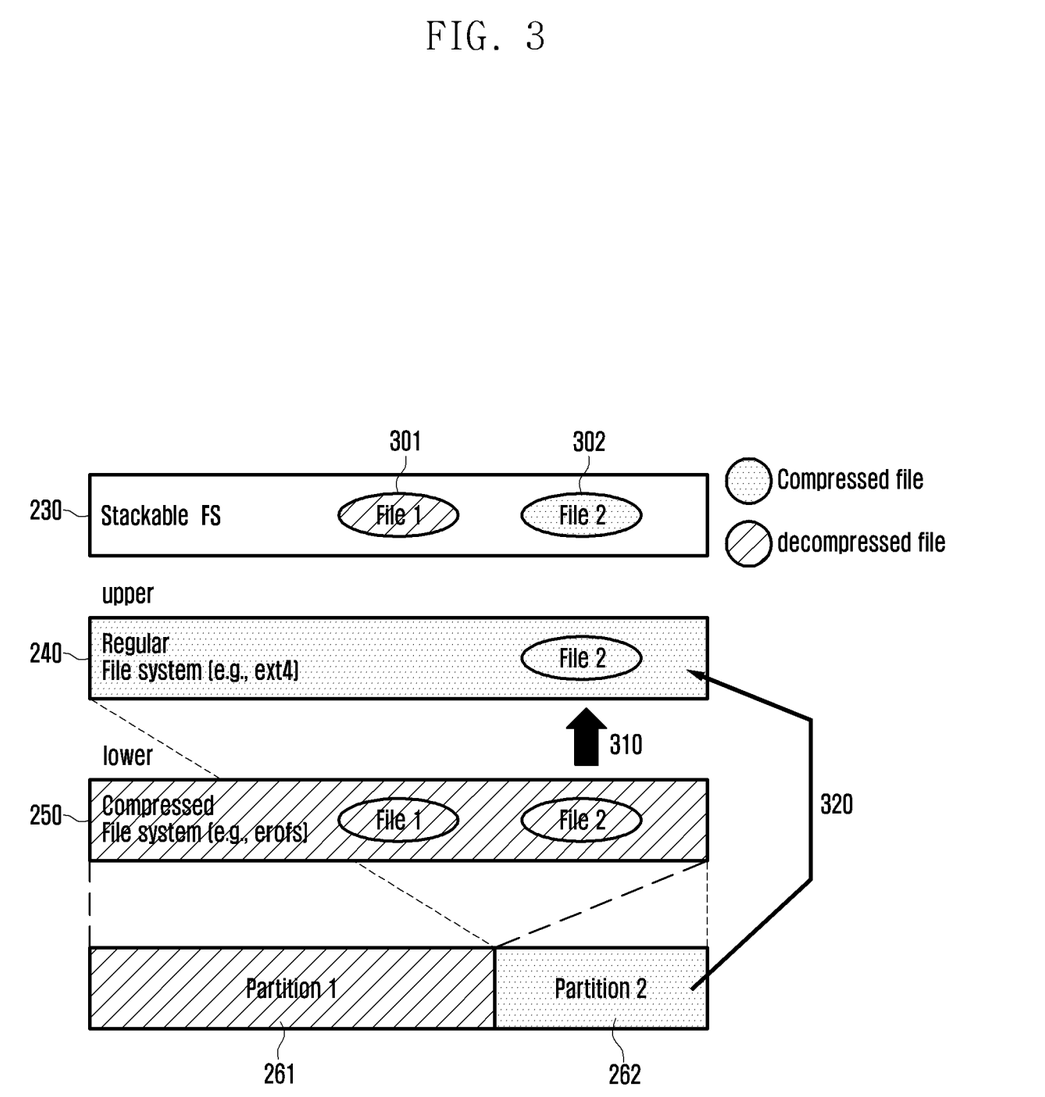
FIG. 3 is a block diagram illustrating a construction and an operation of an electronic device according to various embodiments.

In this case, the first path 310 may mean a path along which data is copied from the lower file system 250 to the upper file system 240. The second path 320 may mean a path along which data is copied from the second partition 262 of the storage 260 to the upper file system 240.

According to an embodiment, the electronic device 200 may further include a block device driver (not illustrated) configured to control the memory 220 and a storage driver (not illustrated) configured to control the storage 260. The first path 310 may include a path along which a copy of a file or data is requested from the upper file system 240 to the lower file system 250 via the block device driver (not illustrated) is requested. The second path 320 may include a path along which a copy of a file or data from the upper file system 240 to the second partition 262 of the storage 260 via the storage driver (not illustrated) is requested.

According to an embodiment, the processor 210 may store a system file capable of being read or written on the second partition 262. Furthermore, the processor 210 may store a system file capable of being read only on the first partition 261. For example, a system file may be compressed and stored in the first partition 261. A file configured to be compressed and stored in response to a user command (or according to a predetermined list or policy) among user files may be stored in the first partition 261. A file configured to be decompressed or uncompressed and stored may be stored in the second partition 262.

According to an embodiment, the processor 210 may change whether to compress and store a file based on whether a file stored in the storage 260 is to be executed (or accessed). For example, if a compression file has been executed (or accessed) by a designated number of times or more during a designated time, the processor 210 may decompress the corresponding file and store the decompressed file in the upper file system 240.

The upper file system 240 may be configured to store a file in the second partition 262 capable of being read and written by using a file system including a fourth extended file system (EXT4), a flash-friendly file system (F2FS), an XFS, or a B-tree file system (BTRFS). The lower file system 250 may be configured to compress and store a file in the first partition 261 for a read-only purpose by using a compression file system including an SQUASHFS, an enhanced read-only file system (EROFS), or flash-friendly file system (F2FS)-compression. The upper file system 240 may initially maintain an empty state, and may copy and store a file decompressed in the lower file system 250 or the second partition 262. The lower file system 250 may record an image on the first partition 261 when the electronic device 200 is produced in a read-only state or when a system is initialized. At this time, the electronic device 200 may control the image recorded on the first partition 261 to be not modified by using the storage 260. Furthermore, the image recorded on the first partition 261 may maintain a read-only state.

FIG. 3 illustrates, as a block diagram, a construction and an operation of an electronic device according to various embodiments.

An electronic device according to a comparison embodiment in the related art may compress and store a file in order to reduce a ROM capacity. In this case, when an application and a service execution binary stored in a system partition of the electronic device are loaded, an execution speed may be slowed because an operation of decompressing the compressed file is required. In order to prevent a reduction of the execution speed, the electronic device may select a file that is expected to be frequently used, and may optionally decompress a corresponding file at the time of manufacturing. However, to uniformly manage a compression file without taking into consideration of a pattern of a user may be inefficient because a file access pattern may be different for each user of an electronic device.

An electronic device (e.g., the electronic device 200 in FIG. 2) according to various embodiments may open a requested file in the upper file system 240 if the file is present in the upper file system 240 when the file is accessed by using a file system. If the requested file is not present in the upper file system 240, the electronic device 200 may search the lower file system 250 for the requested file and open the requested file. The electronic device 200 according to various embodiments of the disclosure may optimize an application and a service execution time by separately decompressing and storing a file that is frequently used or accessed while the electronic device 200 is used. Furthermore, the electronic device 200 may enable a more efficient management of a file system based on a usage pattern of the electronic device 200 for each user.

The stackable file system 230 may read a file (e.g., a first file 301 and/or a second file 302) requested by the application layer by using the upper file system 240 and/or the lower file system 250, and may provide the file to the application layer. At this time, the first file 301 and the second file 302 in the stackable file system 230 of FIG. 3 may be stored in the first partition 261. The stackable file system 230 may refer to the stored files. The stackable file system 230 may refer to and load a stored file from the first partition 261 even without copying the stored file. However, the processor 210 may need to refer to a file (e.g., the first file 301 or the second file 302) to be loaded from the storage 260 or the lower file system 250 whenever the processor 210 loads the first file 301 and/or the second file 302 from a system of the electronic device 200. In this case, the first file 301 and/or the second file 302 stored in the storage 260 or the lower file system 250 may be in a compressed state. An operation of decompressing the first file 301 and/or the second file 302 whenever the first file 301 and/or the second file 302 are loaded from a system of the electronic device 200 may be included. The electronic device 200 according to various embodiments of the disclosure may reduce a system execution time by storing, in the upper file system 240, a file having an access or loading frequency equal to or greater than a first level in the state in which the file has been decompressed and loading the file from the upper file system 240 when the corresponding file is subsequently requested.

According to an embodiment, the upper file system 240 may copy and store the first file 301 and/or the second file 302 stored with the first file 301 and/or the second file 302 decompressed in the lower file system 250 by using the first path 310. Alternatively, the upper file system 240 may copy and store the first file 301 and/or the second file 302 stored with the first file 301 and/or the second file 302 decompressed in the lower file system 250 by using the second path 320.

The processor 210 may copy a file by using the first path 310. In this case, a decompressed file may be disposed in the memory 220. The processor 210 may move the decompressed file from the lower file system 250 to the upper file system 240.

The processor 210 may copy a file by using the second path 320. In this case, unlike in the case where the first path 310 is used, the decompressed file may be in the state in which the file has been retrieved from the memory 220. The processor 210 may obtain an access frequency of a file and store the access frequency in the storage 260, and may select a file accessed by a first level or more with reference to stored data of the access frequency. The processor 210 may decompress a file accessed by the first level or more, may copy and store the decompressed file to and in the second partition 262, and may copy and store the decompressed file to and in the upper file system 240. If a decompressed file is copied to the upper file system 240 by using the first path 310 or the second path 320, a system may be rapidly executed without a decompression operation because the processor 210 may load the decompressed file with reference to the upper file system 240 upon subsequent loading.

According to an embodiment, the processor 210 may delete some files in the upper file system 240 if the capacity of the upper file system 240 is full at timing at which a new file (e.g., the first file 301 or the second file 302) is copied and stored in the upper file system 240. The processor 210 may delete a file having the lowest access frequency or a file stored for a longest time in the upper file system 240. This is merely an example, and a file deletion policy of the upper file system 240 is not limited thereto and may be different based on a configuration of a manufacturer at the time of manufacturing.

According to an embodiment, if the electronic device 200 is subjected to firmware over the air (FOTA) updates and a read-only file system image in the first partition 261 is changed, the electronic device 200 may delete and initiate all of stored files in the second partition 262. In general, it may be difficult to change firmware after the production of the electronic device 200 because the firmware is mounted on a non-volatile memory, such as a ROM, an EPROM, or a flash memory. The FOTA may mean a process of wirelessly distributing firmware, and may require a main process in order to solve a bug in firmware or add a new function.

Figure 4:
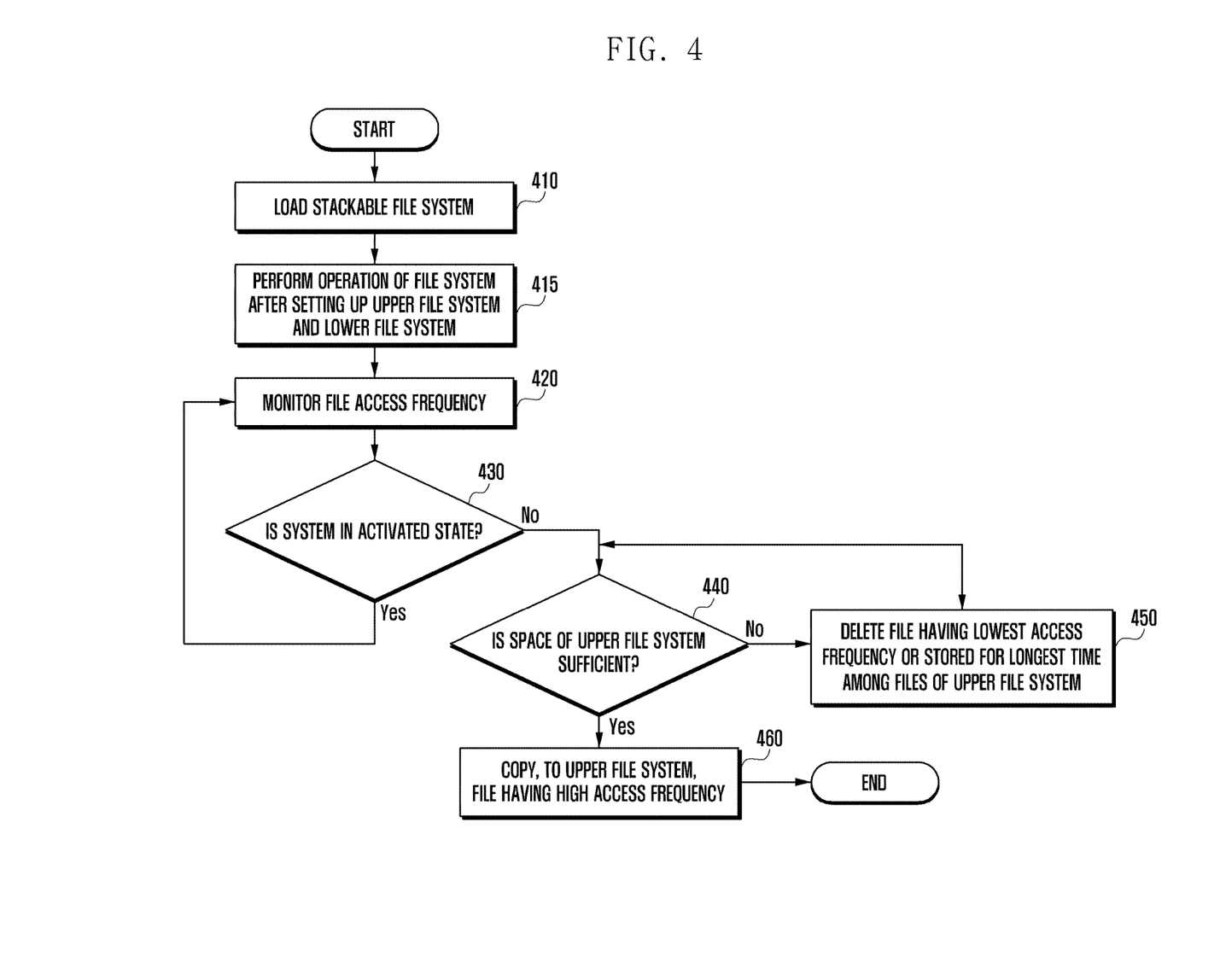
FIG. 4 is a flowchart illustrating a method of operating, by an electronic device, a file system according to various embodiments.

FIG. 4 illustrates, as a flowchart, a method of operating, by an electronic device, a file system according to various embodiments.

An illustrated method 400 may be executed by an electronic device (e.g., the electronic device 200 in FIG. 2) described with reference to FIGS. 1 to 3. The aforementioned technical characteristics are hereinafter omitted. The method of operating, by the electronic device 200, a file system according to various embodiments may include an operation of obtaining, by a stackable file system (e.g., the stackable file system 230 in FIG. 2), a number of times that a file in a lower file system (e.g., the lower file system 250 in FIG. 2) is accessed in response to a request from the application layer, an operation of decompressing a first file having an access number greater than a certain level in the lower file system 250 and copying the file to an upper file system (e.g., the upper file system 240 in FIG. 2), and an operation of controlling the stackable file system 230 to read the copied first file from the upper file system 240 and provide the copied first file to the application layer when a request from the application layer is detected with respect to the copied first file. The operation of providing the file may mean an operation of opening and reading a requested file or reading an already opened file and delivering the read file to the application layer.

According to various embodiments, the stackable file system 230 may provide a file in response to a request from the application layer by using the lower file system 250 and/or the upper file system 240. The operation of providing the file may mean an operation of opening a requested file or reading a file in a mounted (or allocated) path and delivering the file to the application layer.

According to an embodiment, in response to a request from the application layer, the stackable file system 230 may read a requested file from the upper file system 240 and provide the requested file to the application layer when the corresponding file is present in the upper file system 240, and may read a requested file from the lower file system 250 and provide the requested file to the application layer when the corresponding file is not present in the upper file system 240.

In operation 410, a processor (e.g., the processor 210 in FIG. 2) may provide a file to the application layer by using the stackable file system 230 in a memory (e.g., the memory 220 in FIG. 2). When a request from the application layer is detected, the processor 210 may read or open a requested file from or in the memory 220 connected to storage (e.g., the storage 260 in FIG. 2) and provide the requested file to the application layer.

According to various embodiments, the memory 220 may include the stackable file system 230 that provides a file in response to a request from the application layer by using the lower file system 250 and/or the upper file system 240. The stackable file system 230 may search the upper file system 240 or the lower file system 250 for a requested file and open the requested file in response to a request from the application layer.

According to various embodiments, the processor 210 may store, in storage (e.g., the storage 260 in FIG. 2), data having a file form through the stackable file system 230. For example, the stackable file system 230 may mean a data structure managed by the processor 220 in order to store data in the storage 260. The electronic device 200 may use the stackable file system 230 in order to efficiently write data in the storage 260 or read data stored in the storage 260. In various embodiments, for illustrative purposes, the stackable file system 230 is assumed and described as a flash friendly file system (F2FS), but a form of the stackable file system 230 is not limited thereto. For example, the stackable file system 230 may include a file allocation table 16 (FAT16), a file allocation table 32 (FAT32), a new technology file system (NTFS), a second extended file system (ext2), an ext3, an ext4, or ReiserFS. The F2FS may mean a file system optimized for a NAND flash memory based on a log-based storage.

In operation 415, the processor 210 may operate a file system after setting up the upper file system 240 and the lower file system 250. An operating of setting up the upper file system 240 and the lower file system 250 may mean an operation (e.g., a mount) of operatively connecting the processor 210 and the memory 220 in order to load a specific file from a system of the electronic device 200. In general, the mount may mean an operation of designating (e.g., allocating), as a desired directory name on a memory, an initial access path of file system data stored in storage (or arbitrary lower file system), and may be a technology known to those skilled in the art. According to an embodiment of the disclosure, the stackable file system 230 may provide a file in response to a request from the application layer by using the lower file system 250 and/or the upper file system 250. That is, the stackable file system 230 may access a file system that is mounted on a higher level of the lower file system 250 and/or the upper file system 240 and managed by the lower file system 250 and/or the upper file system 240.

According to a comparison embodiment in the related art, a specific file (e.g., the first file 301 or the second file 302 in FIG. 3) may be in the state in which the file has been compressed and stored in the storage 260 or the lower file system 250. When the application layer requests a specific file (e.g., the first file 301 or the second file 302 in FIG. 3), the electronic device 200 may require an operation of opening or decompressing a compressed file. A method of operating, by the electronic device 200, a file system according to the disclosure may include copying some files to the upper file system 240 in the state in which the files have been decompressed based on a file access frequency and controlling the stackable file system 230 to rapidly provide some files to the application layer without a decompression operation by using the upper file system 240. Such an operation of the electronic device 200 will be described below.

In operation 420, the processor 210 may obtain (e.g., monitor) a number of times that the stackable file system 230 accesses a file in the lower file system 240 in response to a request from the application layer. Thereafter, the processor 210 may separately store, in the second partition 262 of the storage 260, a certain level of an access frequency for each file and a file that has been accessed by the certain level or more. Thereafter, in operation 430, the processor 210 may detect whether a system is in an activated state, and when the system is in an idle state ('No' in operation 430), may copy, to the upper file system 240, a file having an access frequency greater than the certain level in the application layer. For example, the processor 210 may copy, to the upper file system 240, a file having an access frequency greater than the certain level in the lower file system 250 by using a first path (e.g., the first path 310 in FIG. 3). Alternatively, the processor 210 may copy, to the upper file system 240, a file having an access frequency greater than the certain level in a second partition (e.g., the second partition 262 in FIG. 2) of the storage 260 by using a second path (e.g., the second path 320 in FIG. 3). However, in operation 440, the processor 210 may determine whether a storage space of the upper file system 240 is sufficient for the file to be copied thereto before copying the file to the upper file system 240.

If the storage space of the upper file system 240 is not sufficient for the file to be copied thereto ("No" in operation 440), the processor 210 may delete some files of the upper file system 240 in operation 450. According to an embodiment, if the capacity of the upper file system 240 is full at a time at which a new file (e.g., the first file 301 or the second file 302) is to be copied and stored in the upper file system 240, the processor 210 may delete some files from the upper file system 240. The processor 210 may delete a file having the lowest access frequency or a file stored for the longest time in the upper file system 240. This is merely an example and a file deletion policy of the upper file system 240 is not limited thereto and may be different based on a configuration at the time of manufacturing.

If the storage space of the upper file system 240 is sufficient for the file to be copied thereto ("Yes" in operation 440), the processor 210 may copy, to the upper file system 240, a file having the highest access frequency (or a file having an access frequency equal to or greater than a first level) in operation 460.

According to an embodiment, the upper file system 240 may copy and store the first file 301 and/or the second file 302 stored with the first file 301 and/or the second file 302 decompressed in the lower file system 250 by using the first path 310. Alternatively, the upper file system 240 may copy and store the first file 301 and/or the second file 302 stored with the first file 301 and/or the second file 302 decompressed in the lower file system 250 by using the second path 320.

According to an embodiment, the processor 210 may copy, to the upper file system 240, a file having an access frequency greater than the first level among files in an area of the lower file system 250 at a time at which a system of the electronic device 200 has been idle. At this time, the file copied to the upper file system 240 may be in a decompressed state. After such a file copy and storage operation, when a read operation for the file (e.g., the first file 301 or the second file 302) copied to the upper file system 240 occurs, the processor 210 may open or read a corresponding file decompressed in the upper file system 240, and may provide the file to the application layer. This may be understood as a process of copying the file by using a first path (e.g., the first path 310 in FIG. 3).

According to an embodiment, the processor 210 may copy and store, to and in the second partition 262, a file accessed by the first level or more by decompressing the file, and may copy and store the decompressed file to and in the upper file system 240. This may be understood as a process of copying the file by using a second path (e.g., the second path 320 in FIG. 3).

The processor 210 may copy a file by using the first path 310. In this case, a decompressed file may be disposed in the memory 220. The processor 210 may move the decompressed file from the lower file system 250 to the upper file system 240.

The processor 210 may copy a file by using the second path 320. In this case, unlike in the case where the first path 310 is used, a decompressed file may be in the state in which the file has been retrieved from the memory 220. The processor 210 may obtain an access frequency of a file and store the access frequency in the storage 260, and may select a file accessed by the first level or more with reference to stored data. The processor 210 may decompress a file accessed by the first level or more, may copy and store the file to and in the second partition 262, and may copy and store a decompressed file to and in the upper file system 240. If a decompressed file is copied to the upper file system 240 by using the first path 310 or the second path 320, a system may be rapidly executed without a decompression operation because the processor 210 may load the decompressed file with reference to the upper file system 240 upon subsequent loading.

According to an embodiment, an operation of requesting a file by the stackable file system 230 may include an operation of providing the first file 301 when the first file 301 is present in the upper file system 240 and providing the first file 301 from the lower file system 250 when the first file 301 is not present in the upper file system 240, when the stackable file system 230 requests the first file 301.

An electronic device (e.g., the electronic device 200 in FIG. 2) according to various embodiments may include storage (e.g., the storage 260 in FIG. 2) including at least one partition, a memory (e.g., the memory 220 in FIG. 2), and a processor (e.g., the processor 210 in FIG. 2) electrically connected to the memory 220 and configured to read or write a file from or to the memory 220. The memory 220 may include a lower file system (e.g., the lower file system 250 in FIG. 2) for compressing and storing a file by using or mounting a first partition (e.g., the first partition 261 in FIG. 2) of the storage 260, an upper file system (e.g., the upper file system 240 in FIG. 2) for decompressing and storing a file by using or mounting a second partition (e.g., the second partition 262 in FIG. 2) of the storage 260 and/or the lower file system 250, and a stackable file system (e.g., the stackable file system 230 in FIG. 2) for providing a file in response to a request from the application layer by using the lower file system 250 and/or the upper file system 240. The processor 210 may obtain the number of times that the stackable file system 230 accesses a file in the lower file system 250 in response to a request from the application layer, may copy, to the upper file system 240, a first file having an access number greater than a certain level by decompressing the first file in the lower file system 250, and may control the stackable file system 230 to read the first file from the upper file system 240 and provide the first file to the application layer when a request from the application layer is detected with respect to the copied first file.

According to an embodiment, when the stackable file system accesses a file in response to a request from the application layer, the processor may control the stackable file system to read a requested file from the upper file system and to provide the corresponding file to the application layer when the requested file is present in the upper file system, and may control the stackable file system to read the requested file from the lower file system and to provide the corresponding file to the application layer when the requested file is not present in the upper file system.

According to an embodiment, the lower file system may compress and store a read-only file.

According to an embodiment, the upper file system may decompress and store a file that supports read and write operations.

According to an embodiment, the processor may delete, for example, at least any one of a file having the lowest access frequency in the upper file system or a file stored for the longest time in the upper file system if a new file is unable to be additionally stored in the upper file system because the capacity of the upper file system is full.

According to an embodiment, the first partition is a read-only partition area for driving the electronic device, and a file system image may be stored in the first partition when the electronic device is produced. At least any one of a plurality of files in the first partition may be decompressed and stored in the second partition.

According to an embodiment, the upper file system may provide the stackable file system with a file by using a file system corresponding to the second partition capable of being written in addition to read, and the lower file system may provide the stackable file system with a file by using a file system corresponding to the first partition capable of being read only.

According to an embodiment, the processor may initialize all files stored in the second partition by deleting or formatting all the files when a file system image of the first partition is changed.

According to an embodiment, the second partition may separately store a second file loaded by more than a certain level from the first partition to the memory, and the processor may decompress and copy, to the upper file system, the second file stored in the second partition.

According to an embodiment, the lower file system may store a file in the first partition by using any compression file system supporting a common compression task or a compression file system including at least any one of a SQUASHFS, an EROFS, and F2FS-compression. The upper file system may store a file in the second partition by using an arbitrary file system supporting a common read and write task or a file system including at least any one of an EXT4, an F2FS, an XFS, and a BTRFS.

A method of operating, by an electronic device, a file system according to various embodiments may include an operation of obtaining a number of times that the stackable file system accesses a file in the lower file system in response to a request from the application layer; an operation of copying, to the upper file system, a first file having an access number greater than a certain level by decompressing the first file in the lower file system, and an operation of controlling the stackable file system to read the first file from the upper file system and to provide the first file to the application layer when a request from the application layer is detected with respect to the copied first file.

According to an embodiment, the operation of controlling the stackable file system to read the first file from the upper file system and to provide the first file to the application layer when a request from the application layer is detected with respect to the copied first file may include an operation of controlling the stackable file system to read a requested file from the upper file system and to provide the corresponding file to the application layer when the requested file is present in the upper file system and an operation of controlling the stackable file system to read the requested file from the lower file system and to provide the corresponding file to the application layer when the requested file is not present in the upper file system, when the stackable file system accesses the file in response to a request from the application layer.

According to an embodiment, the lower file system may compress and store a read-only file.

According to an embodiment, the upper file system may decompress and store a file that supports read and write.

According to an embodiment, the operation of copying, to the upper file system, a first file having an access number greater than a certain level by decompressing the first file in the lower file system may include an operation of deleting at least any one of a file having the lowest access frequency in the upper file system or a file stored for the longest time in the upper file system if the first file cannot be additionally stored in the upper file system because the capacity of the upper file system is full.

According to an embodiment, the upper file system may provide the stackable file system with a file by using a file system corresponding to the second partition capable of being written in addition to being read, and the lower file system may provide the stackable file system with a file by using a file system corresponding to the first partition capable of being read only.

According to an embodiment, the method of operating, by an electronic device, a file system may further include an operation of initializing all files stored in the second partition by deleting or formatting all the files when a file system image of the first partition is changed.

According to an embodiment, the second partition may separately store a second file loaded by more than a certain level from the first partition to the memory. The method of operating, by an electronic device, a file system may further include an operation of decompressing and copying, to the upper file system, the second file stored in the second partition.

While the inventive concept has been particularly shown and described with reference to embodiments thereof, it will be understood that various changes in form and details may be made therein without departing from the spirit and scope of the following claims.

What is claimed is:

1. An electronic device comprising:
a storage;
a memory; and
a processor electrically connected to the memory and configured to read or write a file from or to the memory,
wherein the memory comprises:
a lower file system configured to compress and store at least one file by using a first partition of the storage;
an upper file system configured to compress and store at least one file by using at least one of a second partition of the storage or the lower file system; and
a stackable file system configured to, based on a request from an application layer, provide a requested file by using at least one of the lower file system or the upper file system, and
wherein the processor is configured to:
obtain a number of times in which the stackable file system accesses a corresponding file of the at least one file in the lower file system based on a request from the application layer with respect to the corresponding file;
copy, to the upper file system, a first file having an access number greater than a certain level by decompressing the first file in the lower file system; and
control the stackable file system to read the first file from the upper file system and provide the first file to the application layer based on a request from the application layer being detected with respect to the copied first file,
wherein:
the first partition is a read-only area used to drive the electronic device, and a file system image is stored in the first partition, and
at least any one of the at least one file in the first partition is decompressed and stored in the second partition.

2. The electronic device of claim 1, wherein the processor is further configured to control the stackable file system based on the request from the application layer such that:
the stackable file system is controlled to, based on the requested file being included in the upper file system, read the requested file from the upper file system and provide the requested file to the application layer; and
the stackable file system to controlled, based on the requested file not being included in the upper file system, read the requested file from the lower file system and provide the requested file to the application layer.

3. The electronic device of claim 1, wherein the lower file system is further configured to compress and store a read-only file.

4. The electronic device of claim 1, wherein the upper file system is further configured to decompress and store a file that supports a read operation and a write operation.

5. The electronic device of claim 1, wherein the processor is further configured to, prior to copying of the first file, delete at least any one of a file having a lowest access frequency in the upper file system or a file stored for a longest time in the upper file system.

6. The electronic device of claim 1, wherein:
the upper file system is further configured to provide the stackable file system with the requested file by using a file system corresponding to the second partition that is capable of supporting a write operation and a read operation, and
the lower file system is further configured to provide the stackable file system with the requested file by using a file system corresponding to the first partition that is capable of supporting the read operation only.

7. The electronic device of claim 1, wherein the processor is further configured to, based on the file system image being changed, initialize all of the at least one file stored in the second partition by deleting or formatting all of the at least one file in the second partition.

8. The electronic device of claim 1, wherein:
the second partition separately stores a second file, which has been loaded by more than the certain level from the first partition to the memory, and
the processor is further configured to decompress and copy, to the upper file system, the second file stored in the second partition.

9. The electronic device of claim 1, wherein:
the lower file system is further configured to store the at least one file in the first partition by using an arbitrary compression file system supporting a common compression task or a compression file system comprising at least any one of a SQUASHFS, an enhanced read-only file system (EROFS), and a flash friendly file system (F2FS)-compression, and
the upper file system is further configured to store the at least one file in the second partition by using an arbitrary file system supporting common read and write tasks or a file system comprising at least any one of a fourth extended file system (EXT4), an F2FS, an XFS, and a B-tree file system (BTRFS).

10. A method of operating, by an electronic device, a file system, wherein the electronic device comprises a storage and a memory, the memory comprising a lower file system configured to compress and store at least one file by using a first partition of the storage; an upper file system configured to compress and store at least one file by using at least one of a second partition of the storage or the lower file system; and a stackable file system configured to, based on a request from an application layer, provide a requested file by using at least one of the lower file system or the upper file system, the method comprising:
obtaining a number of times in which the stackable file system accesses a corresponding file of the at least one file in the lower file system based on a request from the application layer with respect to the corresponding file;
copying, to the upper file system, a first file having an access number greater than a certain level by decompressing the first file in the lower file system; and
controlling the stackable file system to read the first file from the upper file system and providing the first file to the application layer based on a request from the application layer being detected with respect to the copied first file, wherein:
the first partition is a read-only area used to drive the electronic device, and a file system image is stored in the first partition, and
at least any one of the at least one file in the first partition is decompressed and stored in the second partition.

11. The method of claim 10, further comprising controlling the stackable file system based on the request from the application layer such that:
the stackable file system is controlled to, based on the requested file being included in the upper file system, read the requested file from the upper file system and provide the requested file to the application layer; and
the stackable file system is controlled to, based on the requested file being included in the upper file system, read the requested file from the lower file system and provide the requested file to the application layer.

12. The method of claim 10, wherein the at least one file in the lower file system includes a read-only file and in a compressed state.

13. The method of claim 10, wherein the first file in the upper file system includes a file that supports a read operation and a write operation and in a decompressed state.

14. The method of claim 10, wherein the copying the first file comprises:
prior to the copying, deleting at least any one of a file having a lowest access frequency in the upper file system or a file stored for a longest time in the upper file system.

15. The method of claim 10, wherein:
obtain the upper file system is configured to provide the stackable file system with the requested file by using a file system corresponding to the second partition that is capable of supporting a write operation and a read operation, and
the lower file system is configured to provide the stackable file system with the requested file by using a file system corresponding to the first partition that is capable of supporting the read operation only.

16. The method of claim 10, further comprising initializing all of the at least one file stored in the second partition by deleting or formatting all of the at least one file in the second partition, based on the file system image in the first partition being changed.

17. The method of claim 10, wherein:
the second partition separately stores a second file, which has been loaded by more than the certain level from the first partition to the memory, and
the method further comprises decompressing and copying, to the upper file system, the second file stored in the second partition.

18. The method of claim 10, wherein:
the lower file system is configured to store a file in the first partition by using an arbitrary compression file system or at least any one compression file system of a SQUASHES, an enhanced read-only file system (EROFS), and a flash friendly file system (F2FS)-compression, and
the upper file system is configured to store a file in the second partition by using an arbitrary file system supporting a common read and write task or at least any one file system of a fourth extended file system (EXT4), an F2FS, an XFS, and a B-tree file system (BTRFS).

* * * * *